(12) United States Patent
Marui

(10) Patent No.: US 11,358,417 B2
(45) Date of Patent: *Jun. 14, 2022

(54) TIRE WITH OFFSET BEVELED KNOBS

(71) Applicant: Shinji Marui, Kobe (JP)

(72) Inventor: Shinji Marui, Kobe (JP)

( * ) Notice: Subject to any disclaimer, the term of this patent is extended or adjusted under 35 U.S.C. 154(b) by 389 days.

This patent is subject to a terminal disclaimer.

(21) Appl. No.: 16/058,639

(22) Filed: Aug. 8, 2018

(65) Prior Publication Data

US 2018/0345732 A1 Dec. 6, 2018

Related U.S. Application Data

(63) Continuation of application No. 15/202,149, filed on Jul. 5, 2016, now Pat. No. 10,065,457.

(51) Int. Cl.
*B60C 11/11* (2006.01)
*B60C 11/03* (2006.01)
*B60C 11/13* (2006.01)

(52) U.S. Cl.
CPC ....... *B60C 11/0332* (2013.01); *B60C 11/0311* (2013.01); *B60C 11/11* (2013.01); *B60C 11/1323* (2013.01); *B60C 11/1376* (2013.01)

(58) Field of Classification Search
CPC ... B60C 11/11; B60C 11/1323; B60C 11/1376
See application file for complete search history.

(56) References Cited

U.S. PATENT DOCUMENTS

| 2,642,914 | A | * | 6/1953 | Palko | B60C 11/0302 |
| | | | | | 152/209.28 |
| 4,819,704 | A | * | 4/1989 | Misawa | B60C 19/001 |
| | | | | | 152/209.1 |
| 5,031,680 | A | | 7/1991 | Kajikawa et al. | |
| 5,918,654 | A | * | 7/1999 | Bossut | B60C 11/12 |
| | | | | | 152/209.14 |
| 10,065,457 | B2 | * | 9/2018 | Marui | B60C 11/1376 |

(Continued)

FOREIGN PATENT DOCUMENTS

| CN | 102381141 A | 3/2012 |
| CN | 103419570 A | 12/2013 |

(Continued)

OTHER PUBLICATIONS

Machine translation for Japan 2008-265501 (Year: 2020).*

(Continued)

*Primary Examiner* — Steven D Maki
(74) *Attorney, Agent, or Firm* — Innovation Capital Law Group, LLP; Vic Lin

(57) ABSTRACT

A tire includes knob sets having leading edge bevels connected by a ramp. The leading edge bevels may be offset in their positions or angles. Each knob set includes a first knob attached to a second knob. The knobs in each set may differ in lengths or in the angles of the leading edge bevels. Each knob set shares a common base and includes a pair of elongate outermost surfaces divided by an optional axial channel. Each knob set includes a lateral edge, medial edge and a trailing edge. Transverse rows of two or more knob sets may vary in lateral spacing between knob sets to provide narrow and wide rows in an alternating pattern. Knob sets may also be included on sidewalls of the tire.

18 Claims, 8 Drawing Sheets

(56) References Cited

U.S. PATENT DOCUMENTS

2002/0092591 A1* 7/2002 Cortes ................ B60C 11/0309
                                                       152/209.18
2004/0238092 A1   12/2004 Colombo et al.
2005/0211353 A1*  9/2005 Bogenschuetz ..... B60C 11/1315
                                                        152/209.1

FOREIGN PATENT DOCUMENTS

| EP | 0655353 B1 | | 1/1997 |
|----|------------|---|--------|
| JP | H01223006 A | | 9/1989 |
| JP | 07-329517 A | * | 12/1995 |
| JP | 07329517 A | | 12/1995 |
| JP | 2005-247153 A | * | 9/2005 |
| JP | 2008-222156 A | * | 9/2008 |
| JP | 2008-265501 A | * | 11/2008 |
| TW | M552441 U | | 12/2017 |

OTHER PUBLICATIONS

Machine translation for Japan 07-329517 (Year: 2020).*
Machine translation for Japan 2008-222156 (Year: 2020).*
Machine translation for Japan 2005-247153 (Year: 2020).*

* cited by examiner

TIRE WITH OFFSET BEVELED KNOBS

CROSS-REFERENCE TO RELATED APPLICATIONS

This application is a continuation of U.S. patent application Ser. No. 15/202,149, filed Jul. 5, 2016, the contents of which are herein incorporated by reference.

BACKGROUND OF THE INVENTION

1. Field of the Invention

The invention relates generally to tires for bicycles and vehicles.

2. Description of Prior Art and Related Information

A need exists for tire treads to strike a better balance between providing grip and enabling ease of riding with less resistance. Conventional treads that provide greater grip tend to decrease the ease of riding while traditional treads that enable very easy riding provide little to no grip.

BRIEF SUMMARY OF THE INVENTION

In accordance with the present invention, structures and associated methods are disclosed which address these needs and overcome the deficiencies of the prior art.

In one aspect, a tire comprises a first knob and a second knob attached to the first knob. The first knob comprises a first leading edge bevel, a first outermost surface and a first length. The second knob comprises a second leading edge bevel, a second outermost surface and a second length. A ramp connects the first beveled leading edge and the second beveled leading edge. The ramp may comprise a curved sidewall or a flat wall.

The second leading edge bevel may be disposed in front of the first leading edge bevel. The first shorter knob may be positioned either lateral to the second longer knob, or medial to the second knob.

The tire may further comprise an optional axial channel disposed in between the first outermost surface and the second outermost surface. The tire may further comprise a base integral with both the first knob and the second knob.

The first knob and the second knob may be disposed in a central zone of an outer surface of the tire. The tire may further comprise a third knob and a fourth knob attached to each other and positioned in an outer zone.

In a further aspect, a tire comprises an outer surface having a central zone, a first sidewall defining a first outer zone, and a second sidewall defining a second outer zone. A first knob set is disposed in the central zone. The first knob set comprises a first forward leading edge bevel, a first recessed leading edge bevel and a first ramp connecting the first forward leading edge bevel and the first recessed leading edge bevel. A second knob set is disposed in the central zone and disposed transversely to the first knob set. The second knob set comprises a second forward leading edge bevel, a second recessed leading edge bevel and a second ramp connecting the second forward leading edge bevel and the second recessed leading edge bevel The first forward leading edge bevel and the first recessed leading edge bevel may be attached to a first common base. The second forward leading edge bevel and the second recessed leading edge bevel may be attached to a second common base.

The first knob set may comprise a first pair of elongate outermost surfaces divided by a first axial channel. The second knob set may comprise a second pair of elongate outermost surfaces divided by a second axial channel.

The tire may further comprise a third knob set disposed in the first outer zone. The third knob set may comprise a third forward leading edge bevel, a third recessed leading edge bevel and a third ramp connecting the third forward leading edge bevel and the third recessed leading edge bevel. A fourth knob set is disposed in the second outer zone. The fourth knob set may comprise a fourth forward leading edge bevel, a fourth recessed leading edge bevel and a fourth ramp connecting the fourth forward leading edge bevel and the fourth recessed leading edge bevel.

In a further aspect, a tire comprises a first knob, a second knob attached to the first knob, a ramp comprising a sidewall connecting the first beveled leading edge and the second beveled leading edge, and a base integral with both the first knob and the second knob. The first knob comprises a first leading edge bevel, a first outermost surface and a first length. The second knob comprises a second leading edge bevel, a second outermost surface and a second length. The second length is greater than the first length and the second leading edge bevel is disposed in front of the first leading edge bevel. An axial channel is disposed in between the first outermost surface and the second outermost surface.

The first knob may be positioned lateral or medial to the second knob.

The first knob and the second knob are disposed in a central zone of an outer surface of the tire. The tire may further comprise a third knob and a fourth knob attached to each other and positioned in an outer zone.

In summary, a tire includes knob sets having leading edge bevels connected by a ramp. The leading edge bevels may be offset in their positions or angles. Each knob set includes a first knob attached to a second knob. The knobs in each set may differ in lengths or in the angles of the leading edge bevels. Each knob set shares a common base and includes a pair of elongate outermost surfaces divided by an optional axial channel. Each knob set includes a lateral edge, medial edge and a trailing edge. Transverse rows of two or more knob sets may vary in lateral spacing between knob sets to provide narrow and wide rows in an alternating pattern. Knob sets may also be included on sidewalls of the tire.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS

Figure 1:
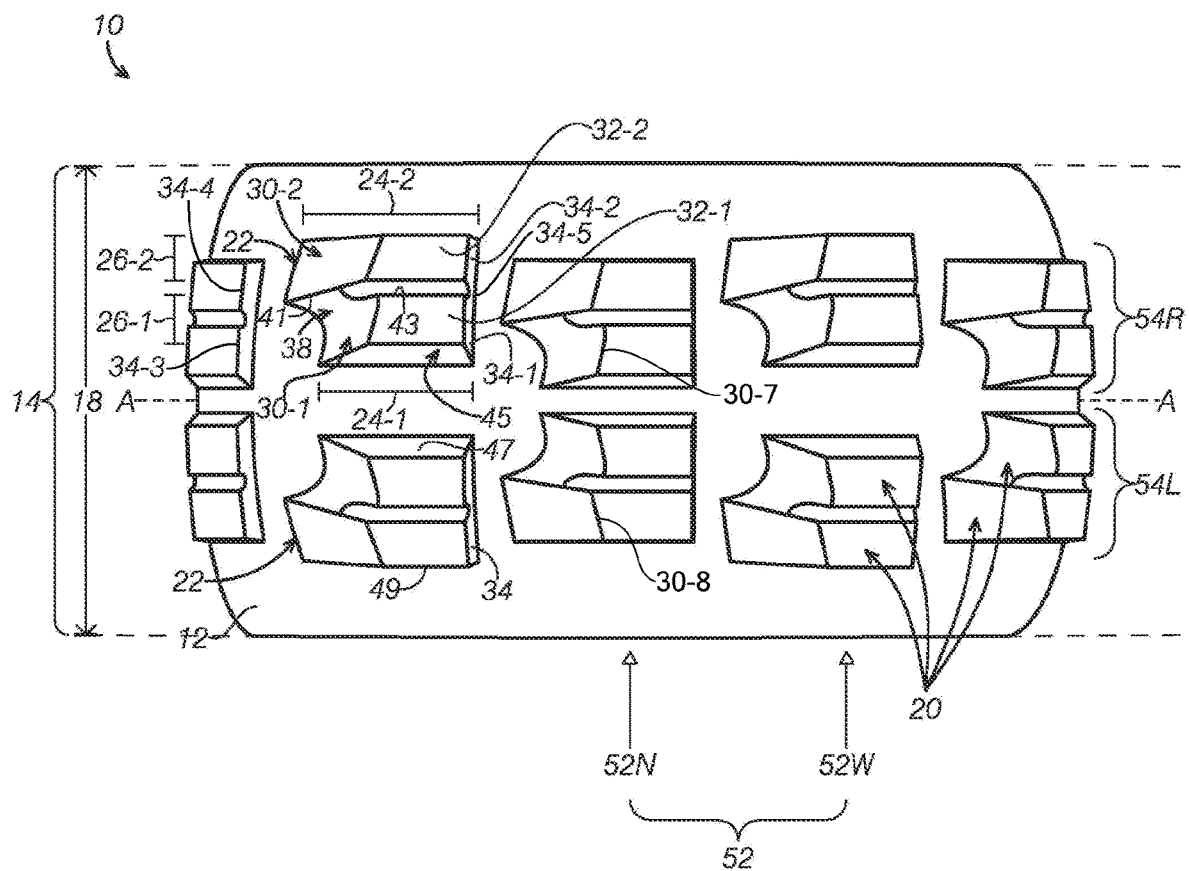
FIG. 1 is a top plan view of a section of a first preferred embodiment of a tire with beveled knob sets.

A first preferred embodiment of a tire apparatus, or simply tire, is illustrated in FIG. 1 and designated generally by the reference numeral 10. The tire may be configured for use with bicycles, scooters, motorcycles, automobiles, trucks, tractors and any other ground vehicle or toy requiring tires. Throughout the specification, "front" or "ahead" refers to a location or direction of a portion of the tire 10 which, when rolling forward, would come into contact with the ground relatively sooner than an adjacent portion of the tire 10.

In FIG. 1, the tire 10 comprises a circumferential outer portion 12. The outer portion 12 comprises a central zone 14 and a pair of outer zones 15 where sidewalls 16 extend radially inward from the central zone 14. The outer tire portion 12 defines a tire circumference. The tire 10 also defines a tire width 18 between the sidewalls 16 as shown in FIG. 1.

The outer tire portion 12 comprises knobs 20 extending radially outward. The knobs 20 are preferably formed in attached pairs 22, or simply knob sets 22. In the preferred embodiment, each knob set 22 comprises a shorter knob 20-1 and a longer knob 20-2 attached side-by-side such that each knob 20-1, 20-2 extends axially and generally parallel to the other.

The longer knob 20-2 defines a second length 24-2 greater than a first length 24-1 of the shorter knob 20-1. A first width 26-1 of the shorter knob 20-1 may be greater, lesser or generally the same as a second width 26-2 of the longer knob 20-2. In the illustrated embodiment, the widths 26-1, 26-2 of the knobs 20-1, 20-2, respectively, in each pair 22 are substantially the same.

The shorter knob 20-1 comprises a first leading edge 30-7, a first leading edge bevel 30-1, a first outermost surface 32-1, a first trailing wall 34-1 and a first trailing edge 34-3. The longer knob 20-2 comprises a second leading edge 30-8, a second leading edge bevel 30-2, a second outermost surface 32-2, a second trailing wall 34-2 and a second trailing edge 34-4. The second leading edge bevel 30-2 is positioned ahead, or in front, of the first leading edge bevel 30-1 such that the longer leading edge bevel 30-2 would engage the ground surface prior to the shorter leading edge bevel 30-1. The second outermost surface 32-2 of the longer knob 20-2 has a greater length than that of the first outermost surface 32-1. In the preferred embodiment, the first outermost surface 32-1 and the second outermost surface 32-2 are preferably elongate in the axial direction. In the preferred embodiment, a single transverse trailing wall 34 is provided for the knob set 22 with a bottom edge 34-5 linearly disposed at the bottom of the single transverse trailing wall 34 of the knob set 22. Therefore, the knobs 20-1, 20-2 in each pair 22 can terminate at the same or different locations.

A step, or ramp, 38 connects and transitions the first leading edge bevel 30-1 to the second leading edge bevel 30-2. In the preferred embodiment, the ramp 38 comprises surface that begins from a medial linear edge 41 of the longer leading edge bevel 30-2 and curves continuously and rearwardly into the first leading edge bevel 30-1. The ramp 38 may comprise a curved, concave surface or a variety of other surfaces and contours so as to connect the leading edge bevels.

It will be appreciated that each knob set 22 shares a common base 45 that is integral to both the shorter knob 20-1 and longer knob 20-2. The base 45 comprises that portion of the knob set 22 that attaches to the outer surface 12 of the tire 10. Employing a single integral base 45 for each knob set 22 results in a larger footprint with a stronger foundation than those of conventional detached knobs where each conventional knob would have its own separate and smaller base.

Each knob set 22 includes a radially inward channel, or indentation, 43 formed in between the shorter knob 20-1 and the longer knob 20-2 so as to divide said outermost surfaces 32-1, 32-2, splitting what would otherwise be a single outermost surface into a pair of outermost surfaces 32-1, 32-2. The length of the axially elongate channel 43 may be longer or shorter than the lengths of the outermost surfaces 32-1, 32-2.

Therefore, each knob set 22 comprises a pair of juxtaposed elongate knobs 20-1, 20-2 with offset leading edge bevels 30-1, 30-2, connected by a ramp 38, a pair of outermost surfaces 32-1, 32-2 which may or may not be parallel, and a common base 45.

While the preferred knob set 22 in the first preferred embodiment of a tire 10 has been heretofore described as a pair of attached knobs 20, one shorter 20-1 and the other longer 20-2, the preferred knob set 22 may be alternatively described as a single knob structure 22 having offset leading edge bevels, namely a first forward leading edge bevel 30-2 and a first recessed leading edge bevel 30-1 connected by a ramp 38. The single knob structure 22 comprises a pair of outermost surfaces 32-1, 32-2 divided by an axial channel 43. The knob structure further comprises a medial sidewall 47, a lateral sidewall 49 and a trailing wall 34.

In contrast to a conventional knob which would consist of only a single leading edge bevel and a single outermost surface, the preferred knob structure 22 according to the first preferred embodiment comprises a pair of offset leading edge bevels 30-1, 30-2 connected by a ramp 38, thereby providing a total of three leading edge surfaces 30-1, 30-2, 38 for each knob structure 22. Furthermore, the preferred knob structure 22 comprises a pair of outermost surfaces 32-1, 32-2 created by indented divider 43. These above features facilitate an improved grip without causing excess resistance.

Figure 2:
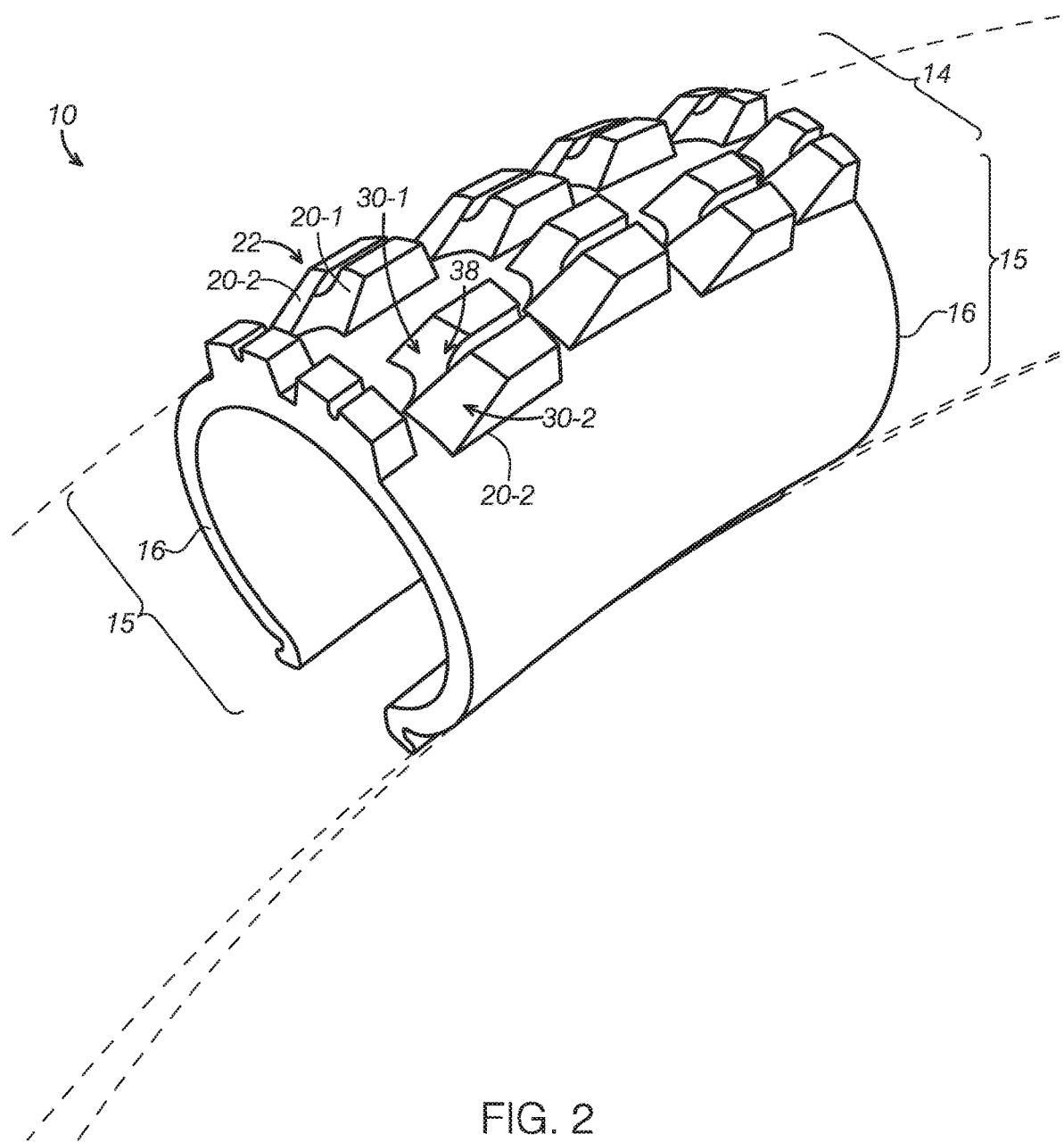
FIG. 2 is a top perspective view of a section of the first preferred embodiment of the tire.

In the preferred embodiment, the tire 10 comprises transverse rows 52 of knob sets 22 where each row 52 preferably comprises at least two knob sets 22. It will be appreciated that the knob sets 22 in each row 43 are symmetrical such that the lateral knob in each set 22 comprises the longer knob 20-2 while the medial knob in each set 22 comprises the shorter knob 20-1. Accordingly, the medial knobs 20-1 in each row 43 are transversely adjacent to each other. Thus, in the first preferred embodiment shown in FIGS. 1 and 2, the two lateral-most knobs throughout the tire 10 preferably comprise the longer knobs 20-2 while the medial knobs comprise the shorter knobs 20-1.

To vary the tread, the knob set rows 52 may vary in the lateral spacing between the knob sets 22. For example, in the first preferred embodiment, a wide row 52W comprises two knob sets 22 that are laterally spaced apart from each a greater distance than the two knob sets 22 in an adjacent narrow row 52N. The tire 10 may thus comprise an alternating pattern of wide knob set rows 52W and narrow knob set rows 52N formed along the axis A, or length, of the tire 10.

In the preferred embodiment, the tire 10 may comprise at least one axial array, or column, of knob sets 22. The illustrated embodiment in FIG. 1 comprises two axial arrays, namely a right axial array 54R of knob sets 22 and a left axial array 54L of knob sets 22. In the first preferred embodiment, each array 54R, 54L comprises knob sets 22 where each lateral knob comprises the longer knob 20-2. In the first preferred embodiment, the knob sets 22 in each array 54R, 54L are not axially aligned, but preferably formed in alternating pattern of a more laterally positioned knob set 22 followed by a more medially positioned knob set 22. In the first preferred embodiment, the axial arrays 54R, 54L of knob sets 22 are located in the central zone 14 of the tire 10, namely, that portion of the tire 10 which would engage the ground when riding straight.

Although two arrays 54R, 54L of knob sets 22 are illustrated in the first preferred embodiment, it is to be expressly understood that more or less axial arrays may be formed (e.g., three or more arrays for wider tires).

Figure 3:
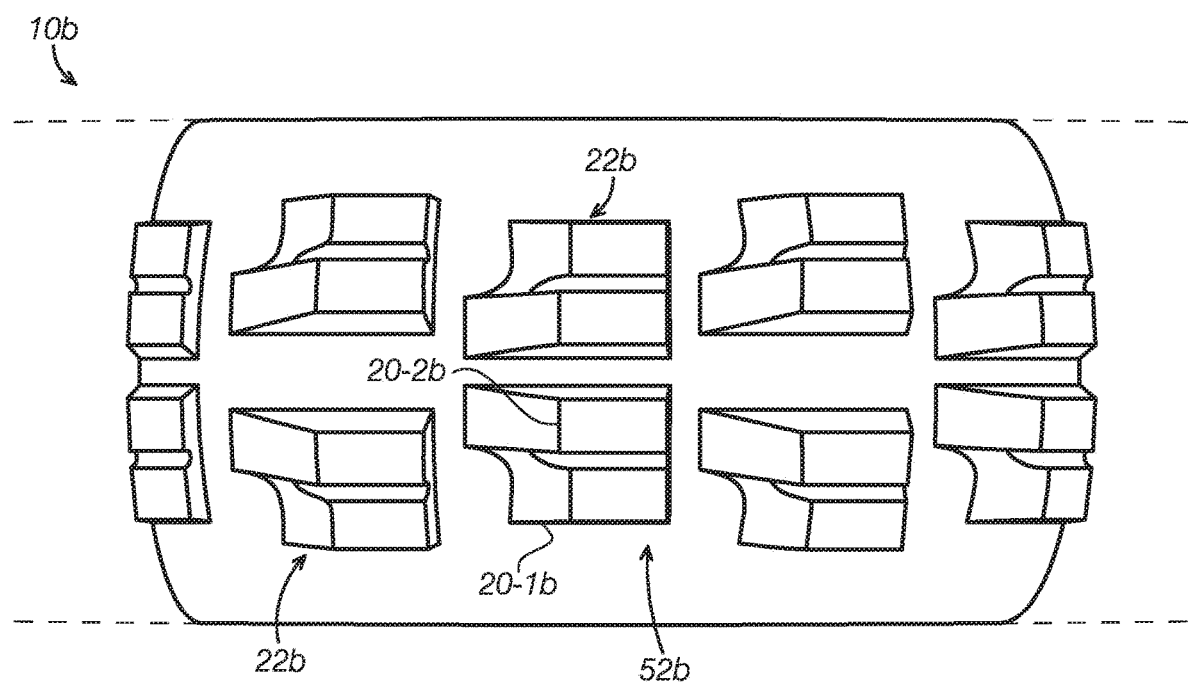
FIG. 3 is a top plan view of a section of a second preferred embodiment of a tire with beveled knob sets.

FIG. 3 shows a second preferred embodiment of a tire 10b where elements of similar structure are designated by the same reference numerals followed by the lower case "b." In the second preferred embodiment, the lateral knob in each knob set 22b comprises the shorter knob 20-1b while the medial knob in each knob set 22b comprises the longer knob 20-2b. Similar to the first preferred embodiment, the rows 52b in the second preferred embodiment may be configured in alternating patterns of a closely spaced pair of knob sets 22b followed by farther spaced pair of knob sets 22b.

Figure 4:
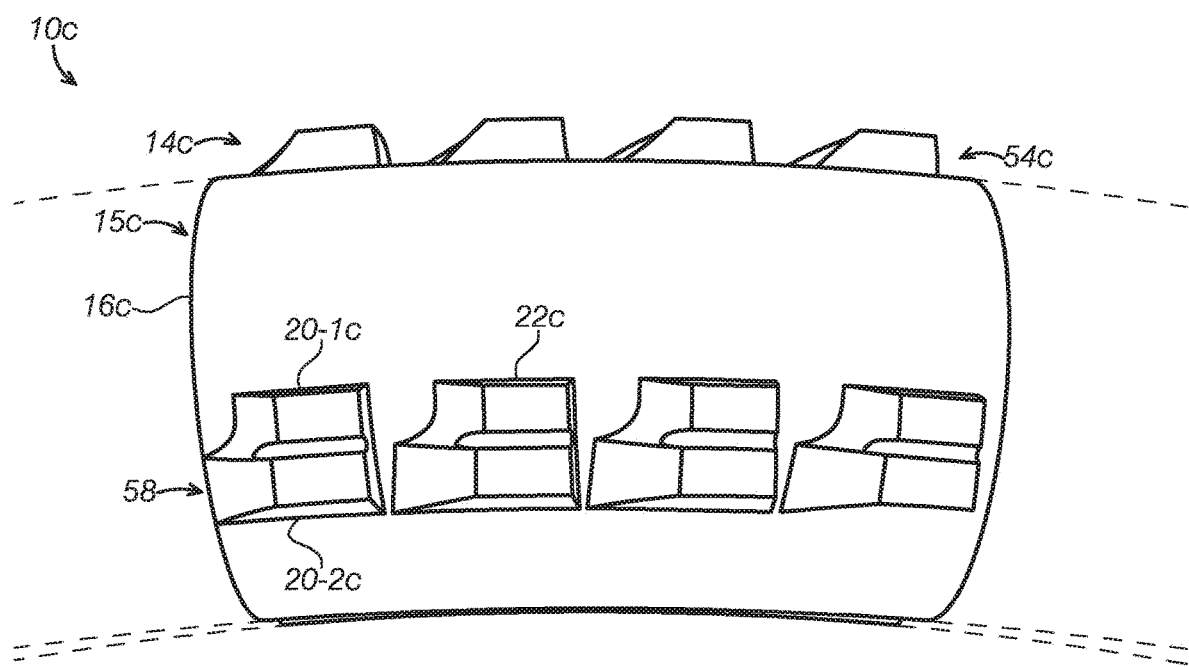
FIG. 4 is a side elevation view of a section of a third preferred embodiment of a tire with beveled knob sets.

FIG. 4 shows a third preferred embodiment of a tire 10c where elements of similar structure are designated by the same reference numerals followed by the lower case "c." The tire 10c may comprise an additional outer array 58 of knob sets 22c on each sidewall 16c. Therefore, the tire 10c would comprise a total of two additional outer arrays 54c of knob sets 22c, namely, one array located in each outer zone 15c in addition to arrays 54c located in the central zone 14c.

In FIG. 4, the lower knob 20-2c of each set 22c comprises the longer knob 20-2c while the upper knob of each set 22c comprises the shorter knob 20-1c.

Figure 5:
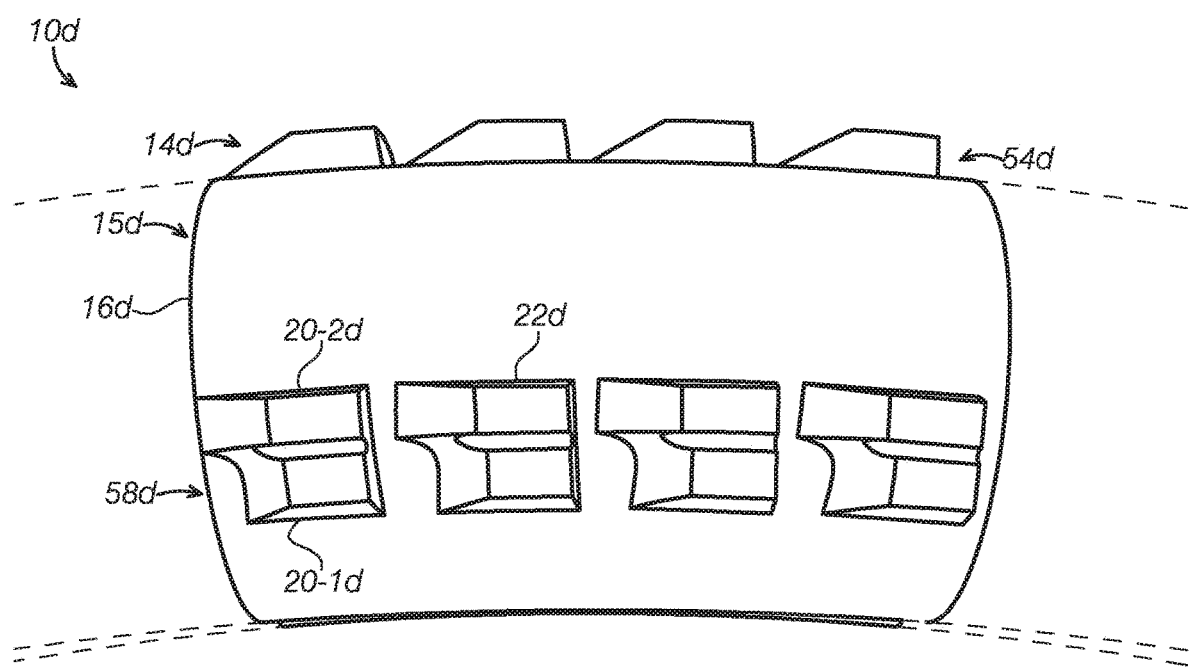
FIG. 5 is a side elevation view of a section of a fourth preferred embodiment of a tire.

FIG. 5 shows a fourth preferred embodiment of a tire 10d where elements of similar structure are designated by the same reference numerals followed by the lower case "d." Similar to the third preferred embodiment shown in FIG. 4, the tire 10d comprises an additional outer array 58d of knob sets 22d on each sidewall 16d in the outer zone 15d in addition to arrays 54d located in the central zone 14d. However, in FIG. 5, the lower knob 20-1d of each set 22d comprises the shorter knob 20-1d while the upper knob of each set 22d comprises the longer knob 20-2d.

Figure 6:
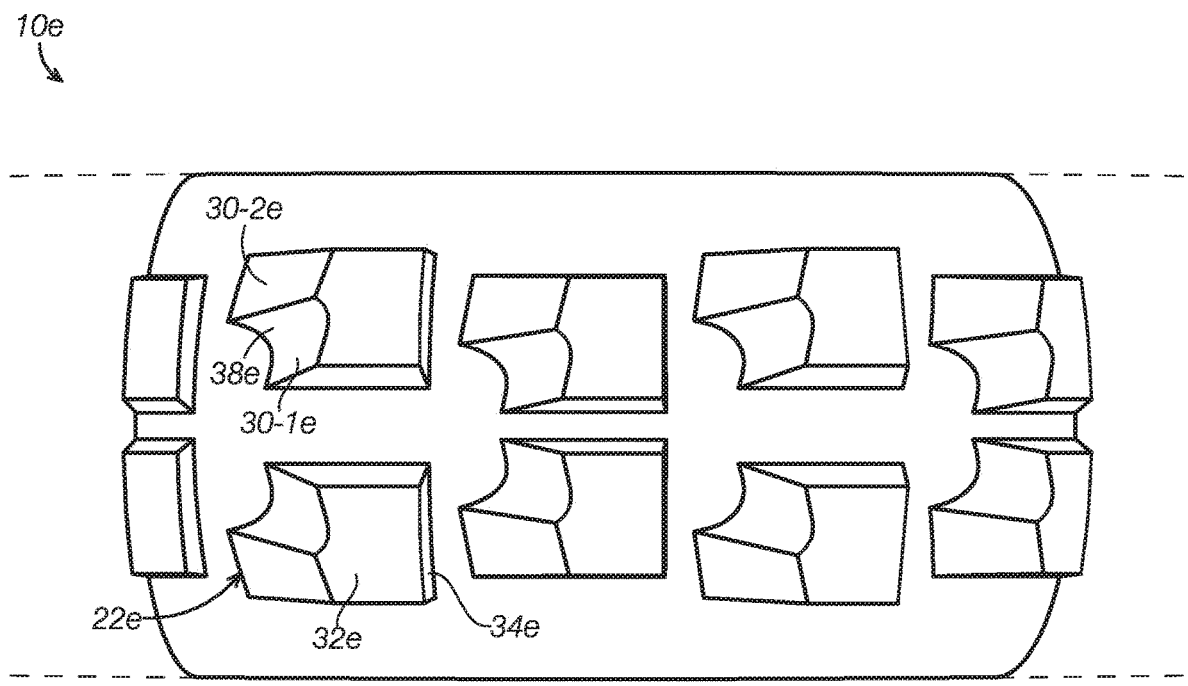
FIG. 6 is a top plan view of a section of a fifth preferred embodiment of a tire.

FIG. 6 shows a fifth preferred embodiment of a tire 10e where elements of similar structure are designated by the same reference numerals followed by the lower case "e." In this preferred embodiment, each knob set 22e comprises a single top surface 32e without an axial channel. Each knob set 22e comprises a first leading edge bevel 30-1e, a second leading edge bevel 30-2e in front of the first leading edge bevel 30-1e, and a connecting ramp 38e. Each knob set 22e may also comprise a trailing wall 34e.

While the more forward leading edge bevels 30-2e are shown in the lateral positions in this illustrated embodiment, it is to be expressly understood that the beveled leading edges may be reversed such that the forward leading edge bevels 30-2e are placed in the medial positions while the recessed leading edge bevels 30-1e are placed in the lateral positions.

Figure 7:
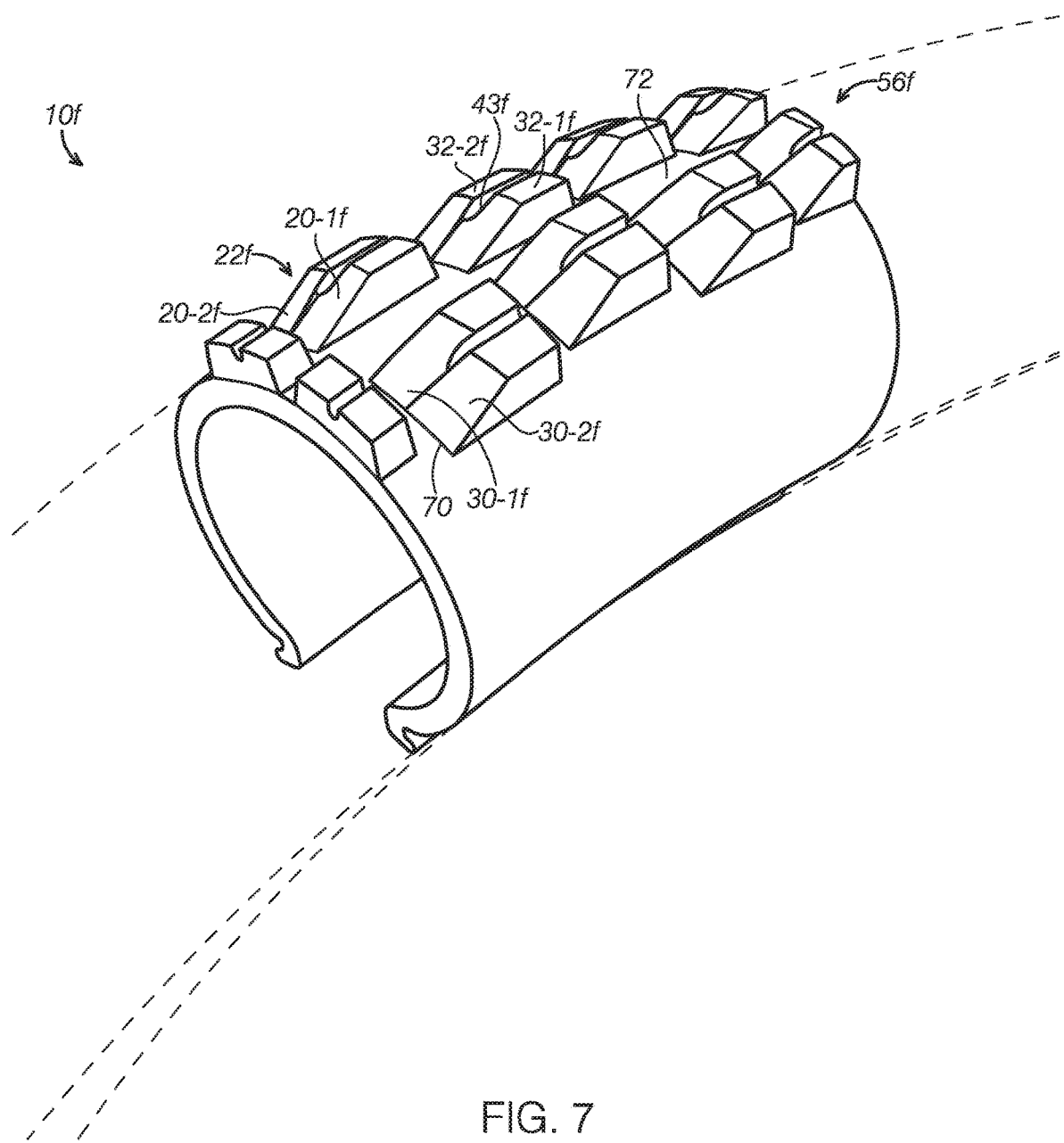
FIG. 7 is a top perspective view of a section of a sixth preferred embodiment of a tire.

FIG. 7 shows a sixth preferred embodiment of a tire 10f where elements of similar structure are designated by the same reference numerals followed by the lower case "f." In this preferred embodiment, each knob set 22f comprises an attached pair of knobs 20-1f, 20-2f that start from a common leading edge 70. Instead of employing pairs of offset knobs, each knob set 22f comprises a first knob 20-1f having a first leading edge bevel 30-1f that is angled differently than that of a second leading edge bevel 30-2f. The angles, or slopes, of the leading edge bevels 30-1f, 30-2f are in reference to the untreaded section 72 of the central zone 56f of the tire 10f.

Each knob set 22f comprises a pair of outermost surfaces 32-1f, 32-2f divided by an optional elongate channel 43f. Without the optional channel 43f, each knob set 22f would alternatively have a single outermost surface. In the illustrated embodiment, the steeper knob 20-2f is positioned on the lateral side of each knob set 22f and comprises a longer outermost surface 32-2f than the outermost surface 32-1f of the lesser angled knob 20-1f located in the medial position of each knob set 22f.

Figure 8:
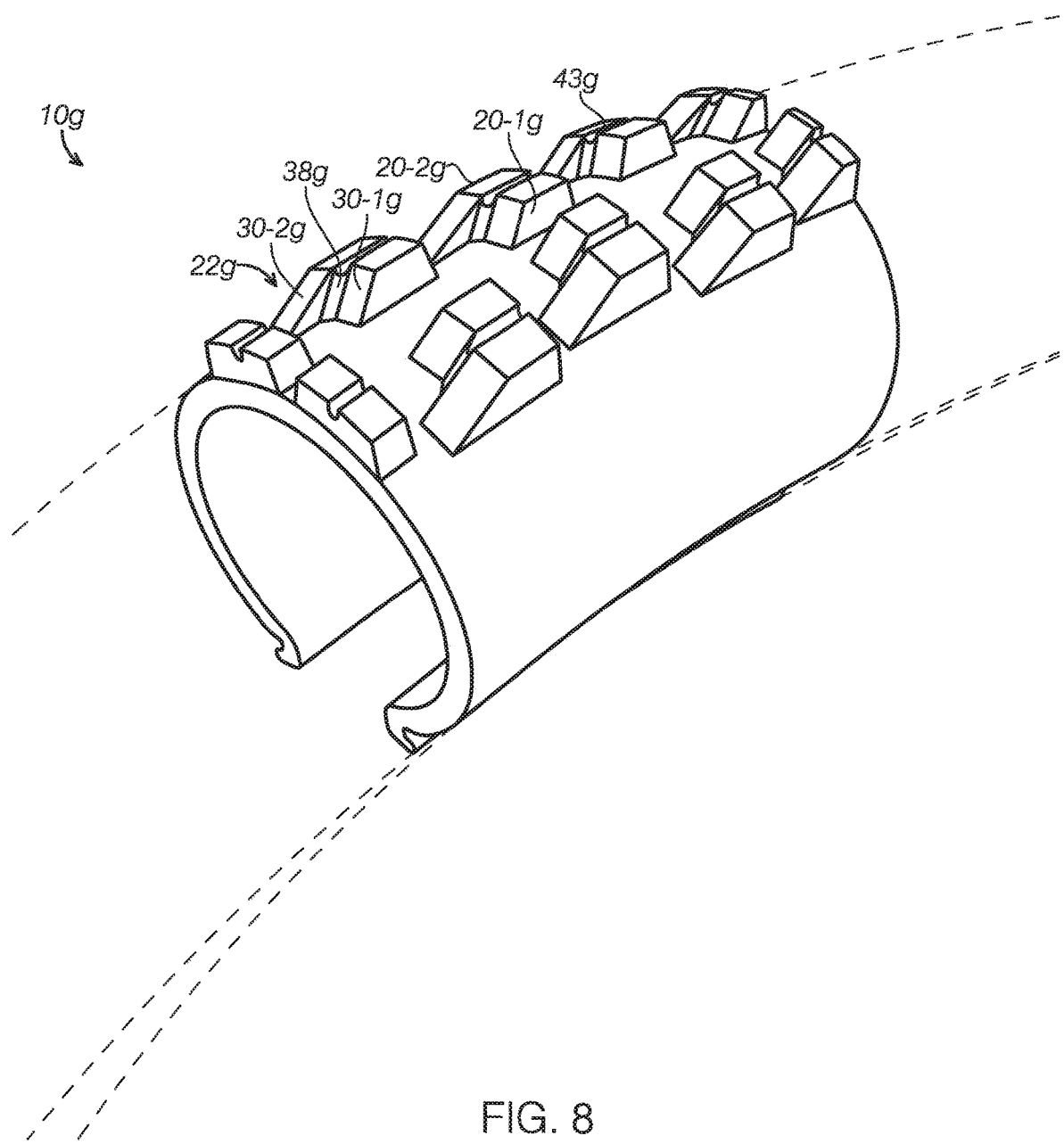
FIG. 8 is a top perspective view of a section of a seventh preferred embodiment of a tire.

FIG. 8 shows a seventh preferred embodiment of a tire 10g where elements of similar structure are designated by the same reference numerals followed by the lower case "g." In this preferred embodiment, each knob set 22g comprises a shorter knob 20-1g and a longer knob 20-2g connected by a flat, or planar, ramp 38g.

The shorter knob 20-1g comprises a first leading edge bevel 30-1g. The longer knob 20-2g comprises a second leading edge bevel 30-2g positioned ahead, or in front, of the first leading edge bevel 30-1g such that the longer leading edge bevel 30-2g would engage the ground surface prior to the shorter leading edge bevel 30-1g. The flat ramp 38g connects and transitions the first leading edge bevel 30-1g to the second leading edge bevel 30-2g. Each knob set 22g may comprise an optional elongate channel 43g formed on the outermost surface.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A tire, comprising:
a plurality of knobs, wherein each knob present on the tire is one of the plurality of knobs, each of the plurality of knobs defined by a first knob or a second knob;
the first knob comprising a first leading edge, a first leading edge bevel, a first outermost surface, a first trailing edge, a first length and a first trailing wall extending from the first trailing edge to a first bottom trailing edge of the first knob;
the second knob attached to the first knob, the second knob comprising a second leading edge, a second leading edge bevel, a second outermost surface, a second trailing edge, a second length and a second trailing wall extending from the second trailing edge to a second bottom trailing edge of the second knob; and
a ramp connecting the first leading edge bevel and the second leading edge bevel,
wherein the first trailing wall and the second trailing wall are parallel to each other and the first bottom trailing edge and the second bottom trailing edge together form a linear line across a width-wise direction of the tire; and
wherein the second leading edge is disposed ahead of the first leading edge such that, during use of the tire, an entirety of the second leading edge contacts a ground surface prior to the first leading edge.

2. The tire of claim 1, wherein the first knob is positioned lateral to the second knob.

3. The tire of claim 1, wherein the first knob is positioned medial to the second knob.

4. The tire of claim 1, wherein the ramp comprises a curved sidewall.

5. The tire of claim 1, further comprising an axial channel disposed in between the first outermost surface and the second outermost surface.

6. The tire of claim 1, further comprising a base integral with both the first knob and the second knob.

7. The tire of claim 1, wherein one first knob and one second knob are disposed in a central zone of an outer surface of the tire, the tire further comprising:
another first knob and another second knob being attached to each other and positioned in an outer zone.

8. A tire, comprising:
an outer surface having a central zone, a first sidewall defining a first outer zone, and a second sidewall defining a second outer zone;
a plurality of knobs, wherein each knob present on the tire is one of the plurality of knobs, each of the plurality of knobs defined by a first knob, a second knob, a third knob or a fourth knob;
a first knob set disposed in the central zone, the first knob set comprising the first knob and the second knob, the first knob having a first forward leading edge and a first forward leading edge bevel, the second knob having a first recessed leading edge and a first recessed leading edge bevel, wherein a first ramp connects the first forward leading edge bevel and the first recessed leading edge bevel; and a second knob set disposed in the central zone and disposed transversely to the first knob set, the second knob set comprising the third knob having a second forward leading edge and a second forward leading edge bevel, the fourth knob having a second recessed leading edge and a second recessed leading edge bevel, wherein a second ramp connects the second forward leading edge bevel and the second recessed leading edge bevel, wherein
a first trailing wall of the first knob and a second trailing wall of the second knob are parallel to each other and a first bottom trailing edge of the first knob and a second bottom trailing edge of the second knob together form a linear line across a width-wise direction of the tire;
the first forward leading edge is disposed ahead of the first recessed leading edge such that, during use of the tire, an entirety of the first forward leading edge contacts a ground surface prior to the first recessed leading edge; and
the second forward leading edge is disposed ahead of the second recessed leading edge such that, during use of the tire, an entirety of the second forward leading edge contacts a ground surface prior to the second recessed leading edge.

9. The tire of claim 8, wherein:
the first forward leading edge bevel and the first recessed leading edge bevel are attached to a first common base; and
the second forward leading edge bevel and the second recessed leading edge bevel are attached to a second common base.

10. The tire of claim 8, wherein:
the first knob set comprises a first pair of elongate outermost surfaces divided by a first axial channel; and
the second knob set comprises a second pair of elongate outermost surfaces divided by a second axial channel.

11. The tire of claim 8, wherein:
the tire includes a plurality of width-wise rows positioned about an outer circumference of the tire, wherein each of the plurality of width-wise rows includes the first knob set and the second knob set;
each of the plurality of width-wise rows include a spacing between the first knob set and the second knob set; and
the spacing between the first knob set and the second knob set in a first one of the plurality of width-wise rows is different from the spacing between the first knob set and the second knob set in another one of the plurality of width-wise rows.

12. The tire of claim 8, wherein the first knob set and the second knob set each have a trailing edge, the trailing edge extending linearly across a width-wise direction of the tire.

13. The tire of claim 12, wherein the trailing edge of both the first knob set and the second knob set lie in a common plane.

14. A tire, comprising:
a plurality of knobs, wherein each knob present on the tire is one of the plurality of knobs, each of the plurality of knobs defined by a first knob or a second knob;
the first knob comprising a first leading edge, a first leading edge bevel, a first outermost surface, a first trailing edge, a first length and a first trailing wall extending from the first trailing edge to a first bottom trailing edge of the first knob;
the second knob attached to the first knob, the second knob comprising a second leading edge, a second leading edge bevel, a second outermost surface, a second trailing edge, a second length and a second trailing wall extending from the second trailing edge to a second bottom trailing edge of the second knob;
a ramp comprising a sidewall connecting the first leading edge bevel and the second leading edge bevel; and
a base integral with both the first knob and the second knob, wherein
the second leading edge bevel, at the second outermost surface, is disposed ahead of the first leading edge bevel, at the first outermost surface, such that, when the tire is in use, the second leading edge bevel contacts a ground surface before the first leading edge bevel;
an axial channel is disposed in between the first outermost surface and the second outermost surface;
the first bottom trailing edge and the second bottom trailing edge together are aligned linearly along a width-wise direction of the tire; and
the second leading edge is disposed ahead of the first leading edge such that, during use of the tire, an entirety of the second leading edge contacts a ground surface prior to the first leading edge.

15. The tire of claim 14, wherein one first knob and one second knob are disposed in a central zone of an outer surface of the tire, the tire further comprising:
another first knob and another second knob being attached to each other and positioned in an outer zone.

16. The tire of claim 14, wherein the first trailing edge and the second trailing edge are generally parallel to each other and to a width-wise direction across the tire.

17. The tire of claim 14, wherein the tire further comprises:
another first knob comprising another first leading edge bevel, another first outermost surface, another first trailing edge and another first length;
another second knob attached to the another first knob, the another second knob comprising another second leading edge bevel, another second outermost surface, another second trailing edge and another second length;
a ramp comprising a sidewall connecting the another first leading edge bevel and the another second leading edge bevel; and
a base integral with both one first knob and one second knob, wherein
the one first knob and the one second knob form a first knob set and the another first knob and the another second knob form a second knob set,
the first knob set positioned alongside, in a width-wise direction, the second knob set, with a spacing therebetween.

18. The tire of claim 17, wherein the first knob set and the second knob set each have a trailing edge, the trailing edge extending linearly across a width-wise direction of the tire.

* * * * *